United States Patent [19]

Noguchi

[11] Patent Number: 5,592,312
[45] Date of Patent: Jan. 7, 1997

[54] METHOD FOR TRANSFORMING COLOR SIGNALS

[75] Inventor: Takafumi Noguchi, Kanagawa-ken, Japan

[73] Assignee: Fuji Photo Film Co., Ltd., Kanagawa-ken, Japan

[21] Appl. No.: 422,915

[22] Filed: Apr. 17, 1995

[30] Foreign Application Priority Data

Apr. 18, 1994 [JP] Japan ................................. 6-078584

[51] Int. Cl.⁶ ................................. H04N 1/46
[52] U.S. Cl. ................... 358/525; 358/500; 358/530; 358/535
[58] Field of Search ................................. 358/500, 525, 358/530, 501, 428, 515, 518, 523, 524, 535; H04N 1/46

[56] References Cited

U.S. PATENT DOCUMENTS

| | | | |
|---|---|---|---|
| 5,428,465 | 6/1995 | Kanamori et al. | 358/525 |
| 5,475,510 | 12/1995 | Ikegami | 358/525 |
| 5,479,272 | 12/1995 | Saito | 358/525 |

Primary Examiner—Kim Vu
Assistant Examiner—Madeleine Anh-Vinh Nguyen

[57] ABSTRACT

In a method for transforming a color signal, a target output color signal component (X, Y, Z) is transformed into an input signal component (B, G, R) by referring to a look-up table, and a target output color signal component, which is not stored in the look-up table, is transformed into an input signal component by an interpolating process. In an output color signal space, a local coordinate system is set by using a successive approximation process, and a desired output color signal component is subjected to linear interpolation in the local coordinate system. A three-dimensional interpolating process is thus carried out quickly and accurately and over the entire color reproduction range.

32 Claims, 5 Drawing Sheets

METHOD FOR TRANSFORMING COLOR SIGNALS

BACKGROUND OF THE INVENTION

1. Field of the Invention

This invention relates to a method for transforming a color signal, wherein output color signal components and the corresponding input signal components, each of which yields each of the output color signal components, are stored in a look-up table in a color image output apparatus, and a target output color signal component is transformed into an input signal component in accordance with the look-up table. This invention particularly relates to a method for transforming a color signal, wherein an improved interpolating process is employed in order to transform an output color signal component, which is other than those stored in the look-up table, into an input signal component.

2. Description of the Related Art

So that a color image having a desired color tone can be formed with a color image output apparatus, such as a laser beam scanning recording apparatus or a printing machine, it is necessary to generate input signal components of an input signal, which controls the laser voltage, the amount of an ink, or the like, in accordance with color signal components of a color signal, which represent picture elements in the image. However, in the actual color image output apparatus, even if the input, such as the laser voltage, is constant, the output color signal component will fluctuate in accordance with the temperature, humidity, development conditions, or the like. Therefore, it is not easy to analytically determine the input signal component corresponding to a target output color signal component.

Therefore, as disclosed in, for example, Japanese Patent Publication No. 58(1983)-16180, a look-up table is created storing a plurality of three-dimensional input signal components, which change in steps and which are fed into a color image output apparatus, and the corresponding three-dimensional output color signal components, each of which is obtained with each input signal component. {The three-dimensional input signal components are herein represented by (B, G, R), and the three-dimensional output color signal components are herein represented by (X, Y, Z).} The look-up table is referred to, and a target output color signal component is thereby transformed into an input signal component.

In the method described above, for reasons of the capacity of the storage means, or the like, it is substantially impossible to store all of the combinations of the three-dimensional output color signal components (X, Y, Z), which are to be obtained, and the corresponding three-dimensional input signal components (B, G, R) in the look-up table. Therefore, ordinarily, an input signal component corresponding to a target output color signal component, which is not stored in the look-up table, is interpolated with a three-dimensional interpolating process from a plurality of input signal components corresponding to a plurality of output color signal components, which are stored in the look-up table and which are close to the target output color signal component.

In general, the three-dimensional input signal component (B, G, R) can be controlled independently with respect to each of the three dimensions. However, the three-dimensional output color signal component (X, Y, Z) cannot be controlled independently with respect to each of the three dimensions. Therefore, when a three-dimensional input signal space, which is formed by a plurality of input signal components, and a three-dimensional output color signal space, which is formed by a plurality of output color signal components, are supposed, the former becomes an orthogonal lattice space, in which the respective input signal components constitute the lattice points, and the latter becomes a distorted lattice space, in which the respective output color signal components constitute the lattice points. As an aid in facilitating the explanation, these signal spaces are illustrated only for two dimensions in FIGS. 2A and 2B. FIG. 2A shows an input signal space. FIG. 2B shows an output color signal space.

Therefore, in such cases, the interpolating process is carried out by utilizing the mapping between the input signal space and the output color signal space. Specifically, in cases where a point (X, Y) shown in FIG. 2B represents the target output color signal component, an orthogonal lattice space, which corresponds to a single distorted lattice space (hatched in FIG. 2B) containing the point (X, Y), is found in the input signal space shown in FIG. 2A. Thereafter, a point (B, G) corresponding to the point (X, Y) is formed in the orthogonal lattice space (hatched in FIG. 2A). The relationship between the point (B, G) and the four lattice points, which define the orthogonal lattice space, is utilized, and the value of an input signal component (B, G) can thereby be calculated with an interpolating process from the four lattice points, which define the orthogonal lattice space, i.e. from the four input signal components stored in the look-up table.

With the conventional three-dimensional interpolating process, an output color signal space is divided into a plurality of unit solid bodies (cubes, tetrahedrons, triangular prisms, or the like). Thereafter, a unit solid body, which contains a desired output color signal component, is specified, and an interpolating process is carried out in the specified solid body.

However, the conventional three-dimensional interpolating process described above has the drawbacks described below.

a) Interpolation cannot be carried out for a point in the vicinity of the boundary of a color reproduction range.

b) A very long time is required to carry out the calculations for specifying the unit solid body.

c) In general, when the number of steps (i.e. the number of gradation divisions) is increased, the accuracy of interpolation becomes higher, but a longer time is required to carry out the calculations.

Therefore, actually, as illustrated in FIGS. 3A and 3B, the output color signal space is rearranged into an orthogonal lattice form. Also, the number of steps is reduced. In this manner, the time required to carry out the calculations is shortened. However, in such cases, the accuracy of interpolation cannot be kept high.

SUMMARY OF THE INVENTION

The primary object of the present invention is to provide a method for transforming a color signal, wherein a three-dimensional interpolating process is carried out sufficiently quickly and accurately.

Another object of the present invention is to provide a method for transforming a color signal, wherein an accurate interpolating process is carried out over the entire color reproduction range.

The present invention provides a first method for transforming a color signal, comprising the steps of:

(1) creating a look-up table storing a plurality of three-dimensional input signal components (B, G, R), which change in steps and which are fed into a color image output apparatus, and the corresponding three-dimensional output color signal components (X, Y, Z), each of which is obtained with one of the three-dimensional input signal components (B, G, R), (2) transforming a target output color signal component (X, Y, Z) into a three-dimensional input signal component (B, G, R) by referring to the look-up table, and (3) interpolating a three-dimensional input signal component (B, G, R) corresponding to a target output color signal component (X, Y, Z), which is not stored in the look-up table, with an interpolating process from a plurality of the three-dimensional input signal components (B, G, R) corresponding to a plurality of the three-dimensional output color signal components (X, Y, Z), which are stored in the look-up table and which are close to the target output color signal component (X, Y, Z), wherein the improvement comprises the steps of:

(4) in carrying out the interpolating process, supposing a three-dimensional input signal space, in which the plurality of the three-dimensional input signal components (B, G, R) stored in the look-up table constitute lattice points, and a three-dimensional output color signal space, in which the plurality of the three-dimensional output color signal components (X, Y, Z) stored in the look-up table constitute lattice points, (5) setting a certain appropriate origin and three linearly independent vectors in the three-dimensional output color signal space, (6) spanning the three vectors from the origin, a local coordinate system being thereby constituted in the three-dimensional output color signal space, (7) transforming the difference between the target output color signal component (X, Y, Z) and the origin into coordinates in the local coordinate system in the three-dimensional output color signal space, (8) updating the origin and the three vectors by utilizing the coordinates in the three-dimensional output color signal space, (9) iterating the operations, which are defined in (6), (7), and (8), a plurality of times, a new local coordinate system and new coordinates being thereby determined in the three-dimensional output color signal space, and

(10) taking a point, which is in a local coordinate system in the three-dimensional input signal space, the local coordinate system corresponding to the new local coordinate system in the three-dimensional output color signal space, and which is represented by the new coordinates, as a three-dimensional input signal component (B, G, R), which corresponds to the target output color signal component (X, Y, Z).

The present invention also provides a second method for transforming a color signal, comprising the steps of:

(1) creating a look-up table storing a plurality of three-dimensional input signal components (B, G, R), which change in steps and which are fed into a color image output apparatus, and the corresponding three-dimensional output color signal components (X, Y, Z), each of which is obtained with one of the three-dimensional input signal components (B, G, R), (2) transforming a target output color signal component (X, Y, Z) into a three-dimensional input signal component (B, G, R) by referring to the look-up table, and (3) interpolating a three-dimensional input signal component (B, G, R) corresponding to a target output color signal component (X, Y, Z), which is not stored in the look-up table, with a linear interpolating process from a plurality of the three-dimensional input signal components (B, G, R) corresponding to a plurality of the three-dimensional output color signal components (X, Y, Z), which are stored in the look-up table and which are close to the target output color signal component (X, Y, Z), wherein the improvement comprises the steps of:

(4) in carrying out the interpolating process, supposing a three-dimensional input signal space, which is constructed in a step form and in which the plurality of the three-dimensional input signal components (B, G, R) stored in the look-up table constitute lattice points, and a three-dimensional output color signal space, which is constructed in a step form and in which the plurality of the three-dimensional output color signal components (X, Y, Z) stored in the look-up table constitute lattice points, (5) setting an origin (i, j, k) and a displacement (di, dj, dk) in the three-dimensional output color signal space, where each of i, j, and k represents the lattice point step position with respect to one of three-dimensional directions, wherein i, j, k=1, 2, 3, . . . , and di, dj, dk=1 or −1, (6) constituting a local coordinate system in the three-dimensional output color signal space by using a point (i, j, k), a point (i+di, j, k), a point (i, j+dj, k), and a point (i, j, k+dk), (7) calculating a representation vector $q=(q_i, q_j, q_k)$, which represents the target output color signal component (X, Y, Z), in the local coordinate system in the three-dimensional output color signal space, (8) approximating each of the values of $i+diq_i$, $j+djq_j$, and $k+dkq_k$ by an integral number, (9) updating the origin (i, j, k) with the integral numbers being taken as a new i, a new j, and a new k, and carrying out a displacement updating process such that, when a representation vector q is calculated by using the updated origin, the displacement di may be reversed if the sign of $q_i$ is minus, the displacement dj may be reversed if the sign of $q_j$ is minus, and the displacement dk may be reversed if the sign of $q_k$ is minus, the processes defined in (5), (6), (7), (8), and (9) being iterated, and

(10) when an updated origin (i, j, k) and an updated displacement (di, dj, dk) have become respectively equal to the predecessor origin (i, j, k) and the predecessor displacement (di, dj, dk) in the three-dimensional output color signal space, interpolating an input signal component point, which is represented by the representation vector $q=(q_i, q_j, q_k)$, with a linear interpolating process from four points (i, j, k), ( i+di, j, k), (i, j +dj, k), and (i, j, k+dk) in a local coordinate system, which is constituted by the four points in the three-dimensional input signal space.

By way of example, the process for rounding to the nearest whole number may be utilized in order to approximate each of the values of $i+diq_i$, $j+djq_j$, and $k+dkq_k$ by an integral number.

As an aid in facilitating the explanation, two-dimensional spaces are assumed as shown in FIGS. 4A and 4B. As illustrated in FIG. 4B, a target output color signal component in the output color signal space is represented by F. Also, as illustrated in FIG. 4A, in the input signal space, the input signal component corresponding to F is represented by f. At this time, if a local coordinate system in the output color signal space, to which F belongs, i.e. a small coordinate system in which it can be regarded that the linearity obtains, is specified, the vector (f–$e_0$) and the vector (F–$E_0$) will have the same coordinate representation in the respective coordinate systems. The following formulas obtain $$(f-e_0)=(e_1-e_0, e_2-e_0)q$$

$$(F-E_0)=(E_1-E_0, E_2-E_0)q$$

where q represents the representation vector indicating the coordinates. Therefore, f is given with F as shown below.

$$f=(F-E0)(e_2-e_0, e_1-e_0)(E_2-E_0, E_1-E_0)^{-1}+e_0$$

Specifically, if the local coordinate system, to which the target output color signal component F belongs, can be specified accurately, the interpolating process becomes possible.

The foregoing also applies to three-dimensional spaces. Therefore, with the method for transforming a color signal in accordance with the present invention, in cases where a three-dimensional local coordinate system can be specified accurately, each of the elements $q_i$, $q_j$, and $q_k$ of the representation vector q takes a value falling within the range of 0 to 1, and successive approximation is carried out by utilizing q as judgment conditions.

With the conventional method, large amounts of operations are required to accurately specify the local coordinate system, to which the target output color signal component F belongs. On the other hand, with the method for transforming a color signal in accordance with the present invention, the local coordinate system, to which the target output color signal component F belongs, is specified with the successive approximation, in which the processes defined above in (5), (6), (7), (8), and (9) are iterated. Ordinarily, it is sufficient for the successive approximation to be carried out three times or at most four times. Also, the successive approximation primarily comprises the approximate calculation, in which the process for rounding to the nearest whole number is utilized, and the process for reversing the displacement (di, dj, dk). Such processes are markedly simpler than the conventional process for selecting a cube or a tetrahedron, which surrounds the target output color signal component. Accordingly, with the method for transforming a color signal in accordance with the present invention, the operations can be carried out quickly.

Further, with the method for transforming a color signal in accordance with the present invention, it is not necessary to rearrange the data stored in the look-up table. Therefore, there is no risk that the accuracy of interpolation becomes low due to data rearrangement.

Furthermore, with the method for transforming a color signal in accordance with the present invention, the linear interpolating process is carried out by utilizing the representation vector in the local coordinate system. Therefore, even if a local coordinate system is ultimately set in the vicinity of the boundary of the color reproduction range, and even if the target output color signal component is located at a point in the vicinity of the boundary of the color reproduction range and on the side outward from the local coordinate system, the linear interpolating process can be carried out by considering the plus and minus signs of the elements $q_i$, $q_j$, and $q_k$ of the representation vector q.

Accordingly, with the method for transforming a color signal in accordance with the present invention, an accurate interpolating process can be carried out over the entire color reproduction range.

With the method for transforming a color signal in accordance with the present invention, the three-dimensional output color signal components (X, Y, Z), which represent tristimulus values (X, Y, Z), and the corresponding three-dimensional input signal components (B, G, R) are stored in the look-up table, and a target output color signal component (X, Y, Z) is transformed into a three-dimensional input signal component (B, G, R) in accordance with the look-up table. The method for transforming a color signal in accordance with the present invention is also applicable when three-dimensional output chromaticity signal components (L*, a*, b*) and the corresponding three-dimensional input signal components (B, G, R) are stored in a look-up table, and a target output chromaticity signal component (L*, a*, b*) is transformed into a three-dimensional input signal component (B, G, R) in accordance with the look-up table. The method for transforming a color signal in accordance with the present invention is further applicable when three-dimensional output optical density signal components (B, G, R) and the corresponding three-dimensional input signal components (B, G, R) are stored in a look-up table, and a target output optical density signal component (B, G, R) is transformed into a three-dimensional input signal component (B, G, R) in accordance with the look-up table. Thus, the method for transforming a color signal in accordance with the present invention is broadly applicable when three-dimensional output signal components, which describe colors, and the corresponding three-dimensional input signal components are stored in a look-up table, and a target output signal component is transformed into a three-dimensional input signal component in accordance with the look-up table.

DESCRIPTION OF THE PREFERRED EMBODIMENTS

The present invention will hereinbelow be described in further detail with reference to the accompanying drawings.

In an embodiment of the method for transforming a color signal in accordance with the present invention, a plurality of three-dimensional input signal components (B, G, R), which changes in steps, and the corresponding three-dimensional output color signal components (X, Y, Z), each of which is obtained with one of the three-dimensional input signal components (B, G, R), are stored in a look-up table. The number of steps (the number of gradations) of the three-dimensional input signal components (B, G, R) and the corresponding three-dimensional output color signal components (X, Y, Z), which are stored in the look-up table, is equal to N. Also, a three-dimensional input signal space, which is constructed in a step form and in which the plurality of the three-dimensional input signal components (B, G, R) stored in the look-up table constitute the lattice points, is assumed. Further, a three-dimensional output color signal space, which is constructed in a step form and in which the plurality of the three-dimensional output color signal components (X, Y, Z) stored in the look-up table constitute the lattice points, is assumed.

Figure 1B:
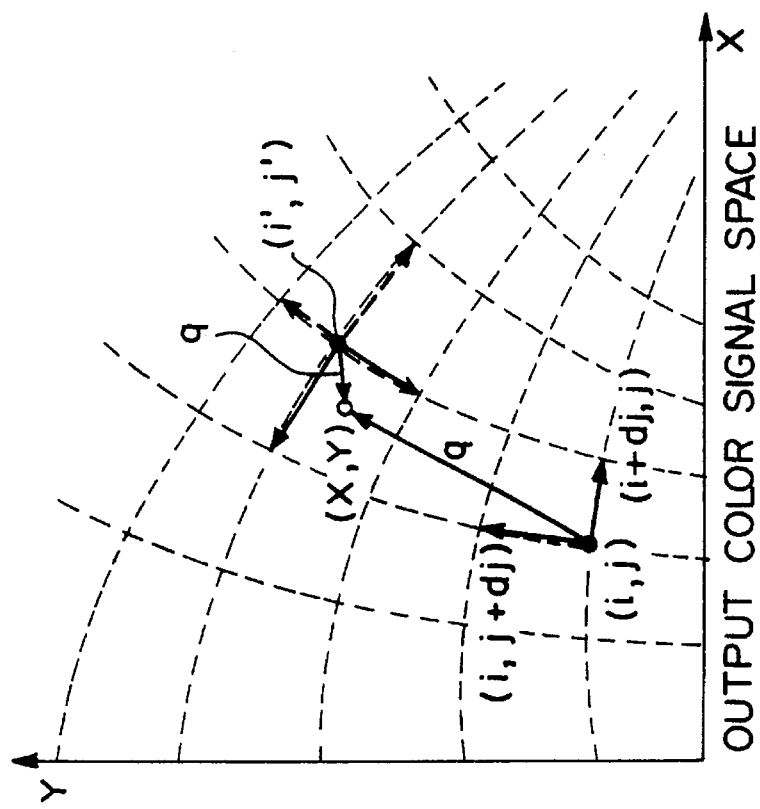
FIGS. 1A and 1B are explanatory views showing the method for transforming a color signal in accordance with the present invention.
Figure 1A:
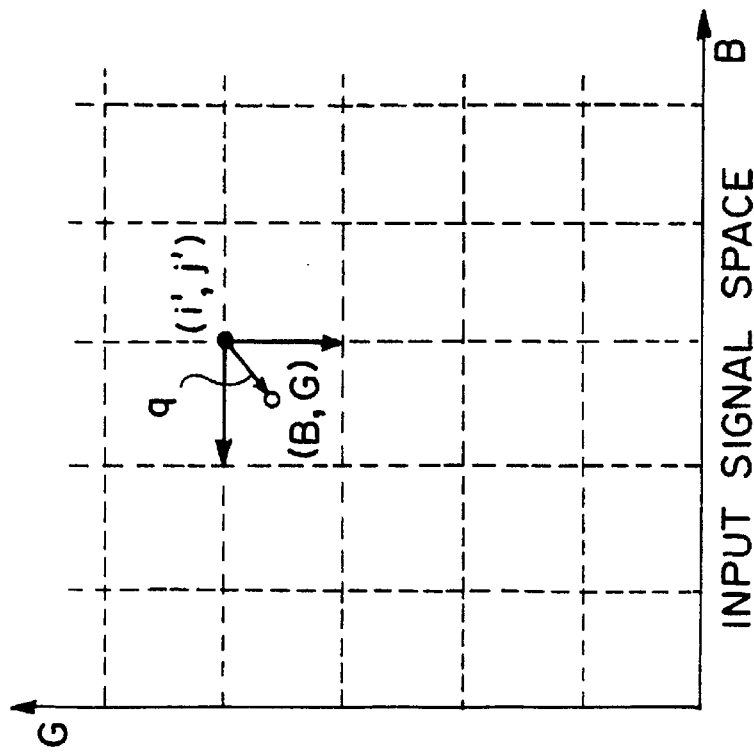
Figure 2A:
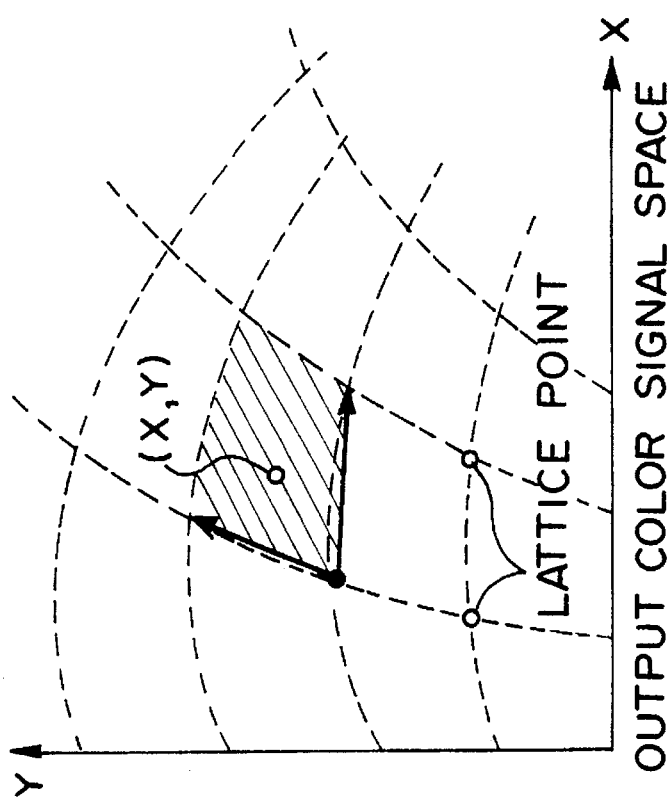
FIGS. 2A and 2B are explanatory views respectively showing an input signal space and an output color signal space.
Figure 2B:
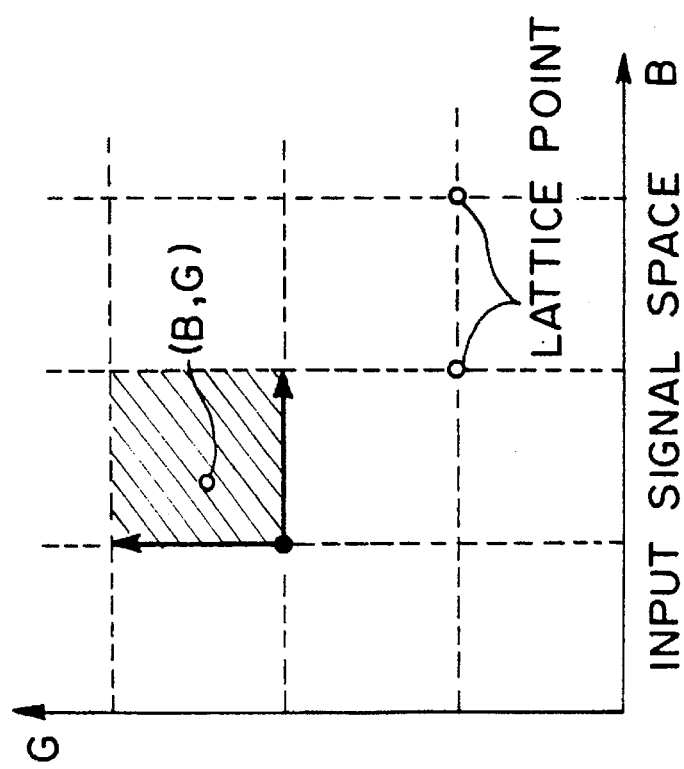
Figure 3B:
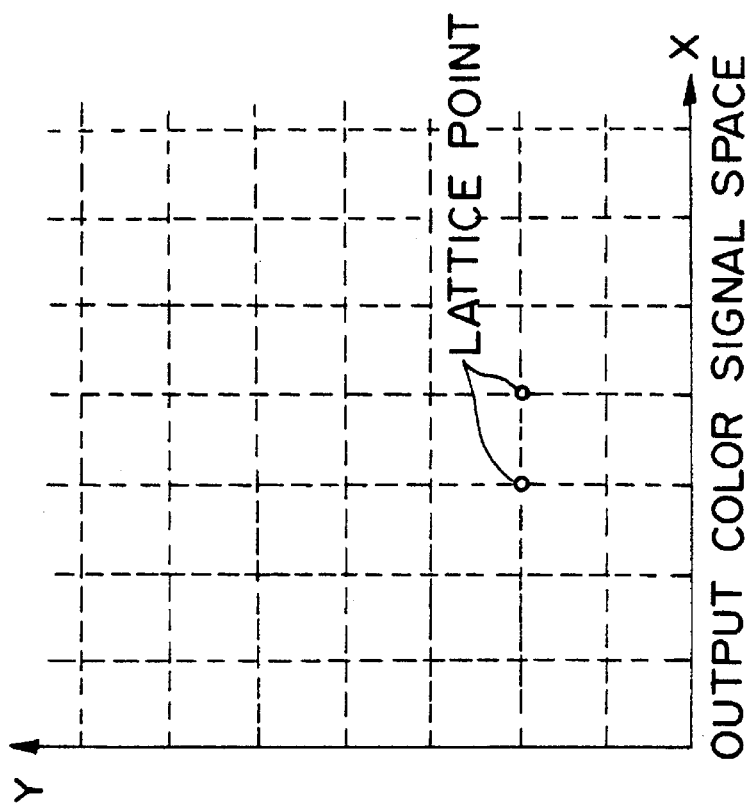
FIGS. 3A and 3B are explanatory views showing how data is rearranged in an output color signal space.
Figure 3A:
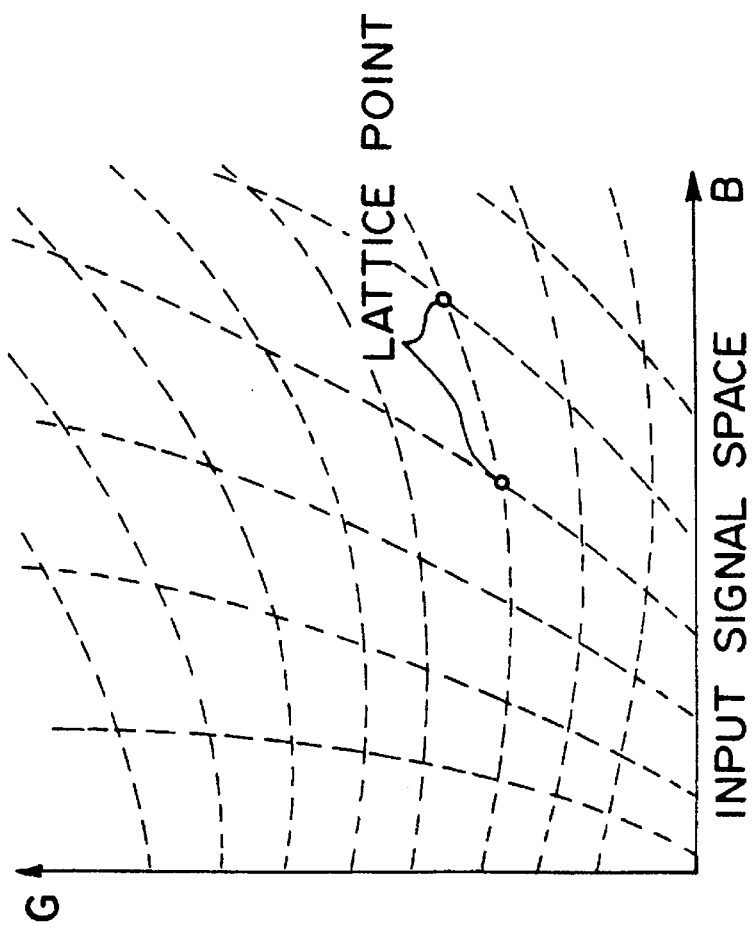
Figure 4B:
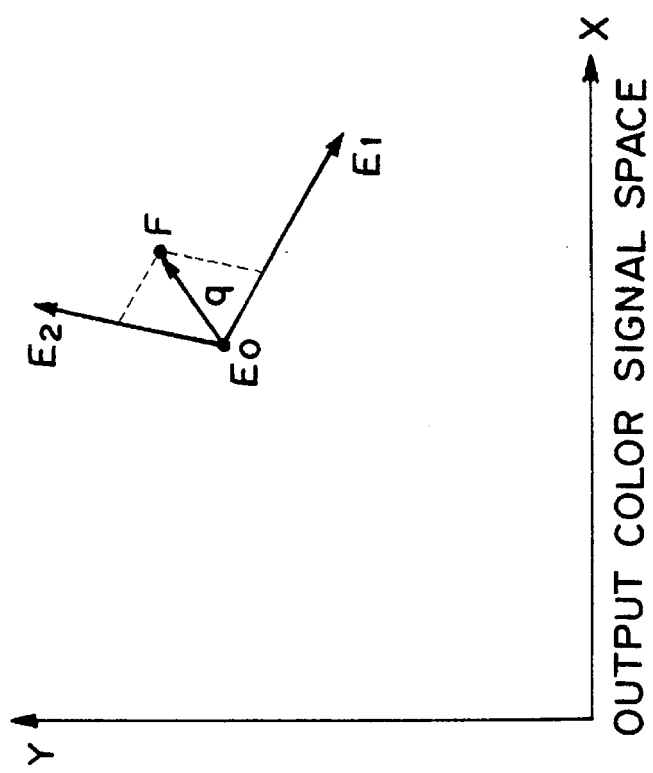
FIGS. 4A and 4B are explanatory views showing the relationship between a local coordinate system in an output color signal space and a local coordinate system in an input signal space.
Figure 4A:
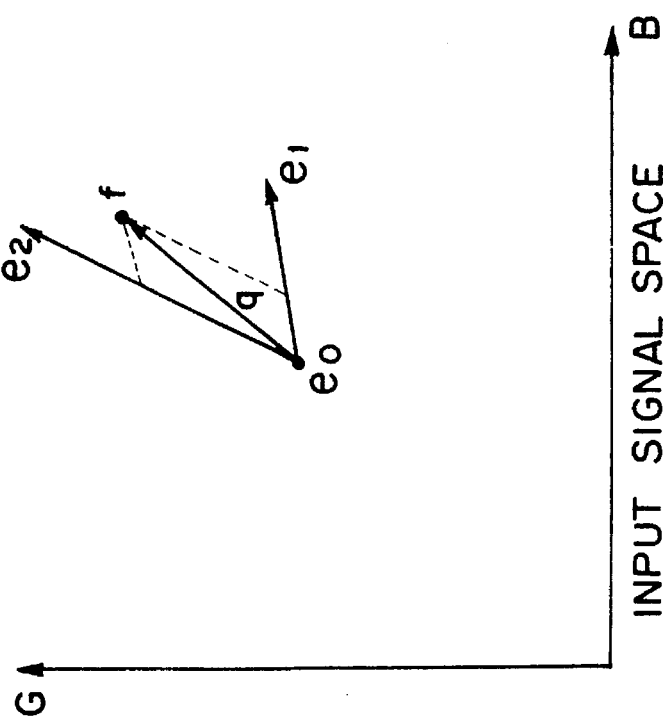

It is difficult to illustrate the three-dimensional input signal space and the three-dimensional output color signal space. Therefore, a two-dimensional input signal space, which is constituted of the input signal components assumed to be of two dimensions, is shogun in FIG. 1A. Also, a two-dimensional output color signal space, which is constituted of the output color signal components assumed to be of two dimensions, is shown in FIG. 1B. As an aid in facilitating the explanation, the two-dimensional input signal space and the two-dimensional output color signal space shown in FIGS. 1A and 1B will often be referred to in the descriptions below.

An input signal component and an output color signal component at a step position (i, j, k), where each of i, j, and k represents the lattice point step position with respect to one of three-dimensional directions, wherein i, j, k=1, 2, 3, . . . , N, are represented by $$BGR_{i,j,k} = (B_{i,j,k}, G_{i,j,k}, R_{i,j,k})$$

$$XYZ_{i,j,k} = (X_{i,j,k}, Y_{i,j,k}, Z_{i,j,k})$$

In particular, in cases where the input signal space takes on the form of an orthogonal lattice form, the suffix can be separated, and the input signal component can be written as $$BGR_{i,j,k} = (B_i, G_j, R_k)$$

Thereafter, in the three-dimensional output color signal space, a local coordinate system is constituted of points shown below.

Origin (i, j, k)

End point (i+di, j, k)

End point (i, j+dj, k)

End point (i, j, k+dk)

where (i,j,k)=(1~N, 1~N, 1~N)

(di,dj,dk)=(±1, ±1, ±1)

A local coordinate system in the output color signal space assumed to be of two dimensions is shown in FIG. 1B. Specifically, in such cases, the local coordinate system is constituted of an origin (i, j), an end point (i+di, j), and an end point (i, j+dj).

All of the local coordinate systems constituted in the manner described above can be described with two vectors (i, j, k) and (di, dj, dk). Therefore, the algorithms for carrying out this embodiment are designed such that the local coordinate system may be successively updated with respect to a target output color signal component (X, Y, Z). Specifically, the two vectors (i, j, k) and (di, dj, dk) are successively updated. In this manner, a correct local coordinate system is selected, and the input signal component (B, G, R) is ultimately calculated. The updating of the local coordinate system is composed of three procedures described below.

In this embodiment, the following are set as the initial values.

Origin (i, j, k)=([N/2], [N/2], [N/2])

Displacement (di, dj, dk)=(+1, +1, +1)

where [] represents the process for rounding to the nearest whole number. Specifically, a local coordinate system is considered, which has the origin at approximately the center point of the three-dimensional output color signal space and which is positive in all of three-dimensional directions.

Procedure 1

Calculation of the Representation Vector q

In this local coordinate system, a representation vector q, which represents the target output color signal component (X, Y, Z), is calculated. Specifically, the transform is carried out with formulas $$e_i = \begin{pmatrix} X_{i+di,j,k} - X_{i,j,k} \\ Y_{i+di,j,k} - Y_{i,j,k} \\ Z_{i+di,j,k} - Z_{i,j,k} \end{pmatrix}$$

$$e_j = \begin{pmatrix} X_{i,j+dj,k} - X_{i,j,k} \\ Y_{i,j+dj,k} - Y_{i,j,k} \\ Z_{i,j+dj,k} - Z_{i,j,k} \end{pmatrix}$$

$$e_k = \begin{pmatrix} X_{i,j,k+dk} - X_{i,j,k} \\ Y_{i,j,k+dk} - Y_{i,j,k} \\ Z_{i,j,k+dk} - Z_{i,j,k} \end{pmatrix}$$

$$\omega = \begin{pmatrix} X - X_{i,j,k} \\ Y - Y_{i,j,k} \\ Z - Z_{i,j,k} \end{pmatrix}$$

Thereafter, the representation vector q is calculated with the formula $$q = \begin{pmatrix} q_i \\ q_j \\ q_k \end{pmatrix} = (e_i, e_j, e_k)^{-1} \omega$$

The representation vector q in the output color signal space assumed to be of two dimensions is shown in FIG. 1B. In such cases, the representation vector q is expressed as $q=(q_i, q_j)$.

Procedure 2

Updating of the Origin (i, j, k)

The origin (i, j, k) is updated by carrying out the approximate calculations with the formulas $$i=[i+di q_i]$$

$$j=[j+dj q_j]$$

$k=\lfloor k+dk q_k \rfloor$

Specifically, the coordinate position of the target output color signal component (X, Y, Z) with respect to each direction in the local coordinate system is added to the step position of the origin of the local coordinate system. The value obtained from the addition is then subjected to the process for rounding to the nearest whole number. The value obtained in this manner is taken as the value of the step position of a new origin. In this manner, a lattice point step position markedly close to the target output color signal component (X, Y, Z) is taken as the origin of a new local coordinate system. In FIG. 1B, the origin of the new local coordinate system is represented by (i', j').

At this time, as measures for relaxation, the clipping is added such that

| if $\|di q_i\|$ | > | $N/4$, | $\|di q_i\|$ | = | $N/4$ |
|---|---|---|---|---|---|
| if $\|dj q_j\|$ | > | $N/4$, | $\|dj q_j\|$ | = | $N/4$ |
| if $\|dk q_k\|$ | > | $N/4$, | $\|dk q_k\|$ | = | $N/4$ |

Also, the boundary conditions are added such that

| if $i \leq 1$, | $i = 1$ and $di = +1$, | if $i \geq N$, | $i = N$ and $di = -1$, |
|---|---|---|---|
| if $j \leq 1$, | $j = 1$ and $dj = +1$, | if $j \geq N$, | $j = N$ and $dj = -1$, |
| if $k \leq 1$, | $k = 1$ and $dk = +1$, | if $k \geq N$, | $k = N$ and $dk = -1$. |

With the clipping described above, in cases where the origin of the originally set local coordinate system and the target output color signal component (X, Y, Z) are far spaced from each other, the origin is temporarily shifted by N/4 by considering that the approximation error is likely to become large.

Also, the boundary conditions described above are set such that, when the step position of the origin becomes not larger than the minimum value of 1, the step position of the new origin is set to be 1. Also, when the step position of the origin becomes not smaller than the maximum value of N, the step position of the new origin is set to be N. Further, the displacement of the local coordinate system is set such that it may be directed inwardly from the boundary.

Procedure 3

Updating of the Displacement (di, dj, dk)

The displacement (di, dj, dk) is updated by carrying out the calculations with the formulas

| $di$ | = | $di \times$ (the sign of $q_i$) |
|---|---|---|
| $dj$ | = | $dj \times$ (the sign of $q_j$) |
| $dk$ | = | $dk \times$ (the sign of $q_k$) |
| $q_i$ | = | $\|q_i\|$ |
| $q_j$ | = | $\|q_j\|$ |
| $q_k$ | = | $\|q_k\|$ |

This process is carried out such that the positive direction along each of three-dimensional directions of the local coordinate system may head towards the target output color signal component (X, Y, Z), i.e. such that the target output color signal component (X, Y, Z) may be enclosed in the positive direction along each of three-dimensional directions of the local coordinate system. Specifically, with reference to FIG. 1B, when the origin of the new local coordinate system is updated to (i', j'), if the local coordinate system indicated by the broken line arrows is set with the displacements being kept at di=1 and dj=1 as before, the sign of $q_i$ and the sign of $q_j$ of the representation vector q representing the target output color signal component (X, Y, Z) will become minus. In such cases, the displacements di and dj are reversed, and the local coordinate system indicated by the solid line arrows extending from the origin (i', j') is set.

The aforesaid operation for updating the local coordinate system is iterated until (i, j, k) and (di, dj, dk) converge, i.e. until an updated origin (i, j, k) and an updated displacement (di, dj, dk) become respectively equal to the predecessor origin (i, j, k) and the predecessor displacement (di, dj, dk). As a result, the target output color signal component (X, Y, Z) is taken into the local coordinate system, and each of the elements $q_i$, $q_j$, and $q_k$ of the representation vector q takes a value falling within the range of 0 to 1.

In the method for transforming a color signal in accordance with the present invention, the approximate calculation utilizing the process for rounding to the nearest whole number should preferably applied. In such cases, marked converging characteristics can be obtained.

Figure 5:
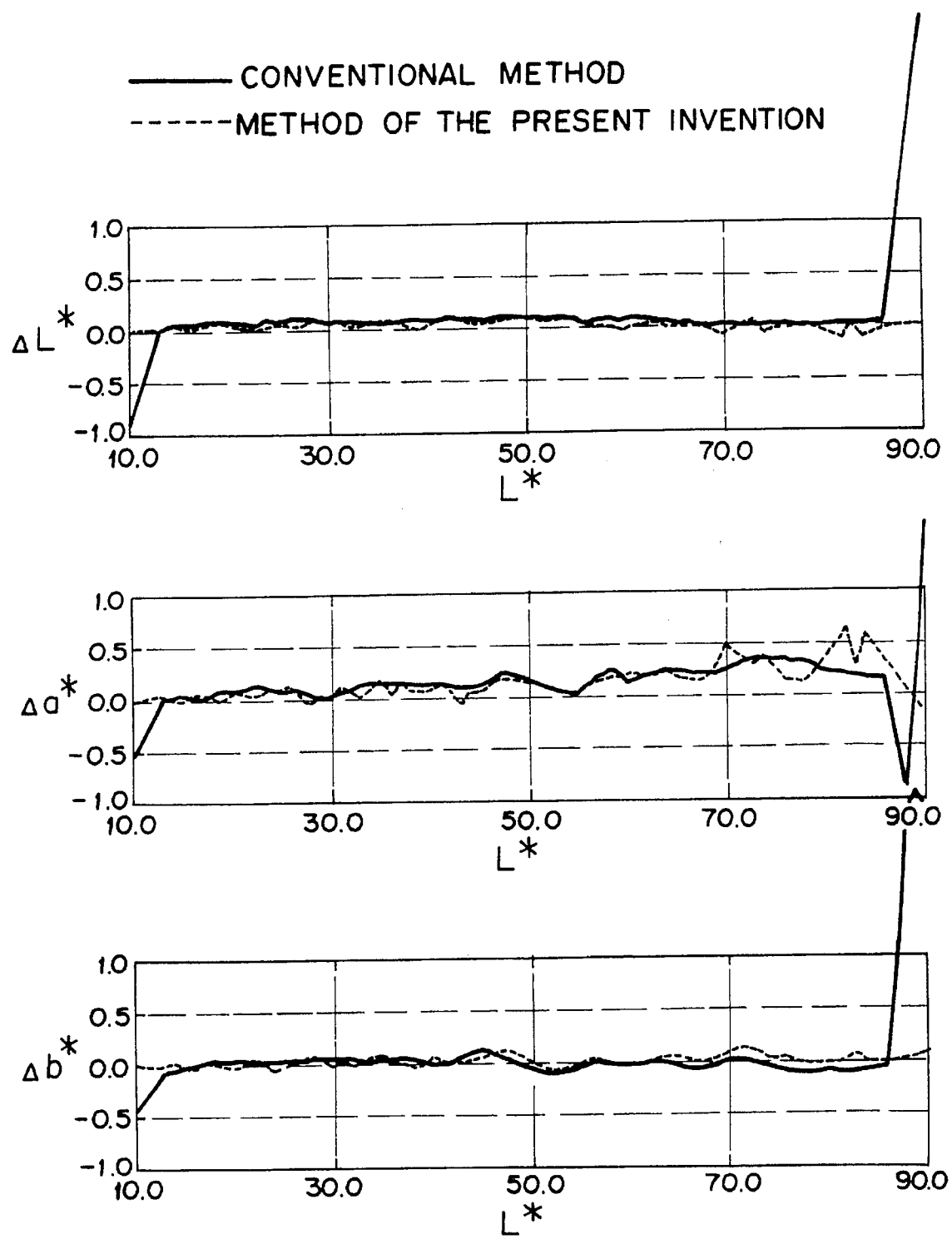
FIG. 5 is a graph showing signal transform performance evaluation curves for the method for transforming a color signal in accordance with the present invention and a conventional method.

In the manner described above, the local coordinate system, to which the target output color signal component (X, Y, Z) belongs, can be specified accurately. Thereafter, the local coordinate system in the three-dimensional input signal space, which system corresponds to the local coordinate system having been specified in the three-dimensional output color signal space, is formed. Specifically, the local coordinate system, which is constituted by four points (i, j, k), (i+di, j, k), (i, j+dj, k), and (i, j, k+dk) in the three-dimensional input signal space, is formed. In the local coordinate system thus formed in the three-dimensional input signal space, an input signal component point, which is represented by the representation vector $q=(q_i, q_j, q_k)$, is interpolated with a linear interpolating process from the four points (i, j, k), (i+di, j, k), (i, j+dj, k), and (i, j, k+dk). Specifically, ultimately, the three-dimensional input signal component (B, G, R), which yields the target output color signal component (X, Y, Z), can be calculated by using the formulas $$u_i = \begin{pmatrix} B_{i+di,j,k} - B_{i,j,k} \\ G_{i+di,j,k} - G_{i,j,k} \\ R_{i+di,j,k} - R_{i,j,k} \end{pmatrix}$$

$$u_j = \begin{pmatrix} B_{i,j+dj,k} - B_{i,j,k} \\ G_{i,j+dj,k} - G_{i,j,k} \\ R_{i,j+dj,k} - R_{i,j,k} \end{pmatrix}$$

$$u_k = \begin{pmatrix} B_{i,j,k+dk} - B_{i,j,k} \\ G_{i,j,k+dk} - G_{i,j,k} \\ R_{i,j,k+dk} - R_{i,j,k} \end{pmatrix}$$

and is thus given by $(B,G,R) = (u_i, u_j, u_k) q$ $u_i q_i + u_j q_j + u_k q_k$ FIG. 5 shows the results of evaluation of the accuracy of interpolation obtained by calculations for the method for transforming a color signal in accordance with the present invention and the conventional method. A transform from optical densities (B, G, R) to chromaticity values (L*, a*, b*) can be given analytically. If the transform is denoted by $\phi$, the formula shown below can obtain.

$$\phi \begin{pmatrix} B \\ G \\ R \end{pmatrix} = \begin{pmatrix} L^* \\ a^* \\ b^* \end{pmatrix}$$

An inverse transform from chromaticity values to optical densities can be defined by creating a look-up table. An inverse transform is herein defined by dividing each of optical densities into 15 steps. If the inverse transform is denoted by $\phi^{-1}$, the formula shown below can obtain $$\phi^{-1} \begin{pmatrix} L^* \\ a^* \\ b^* \end{pmatrix} = \begin{pmatrix} B \\ G \\ R \end{pmatrix}$$

The performance of an interpolation can be estimated by the error $$\text{Error } \Delta = \phi \, \phi^{-1} \begin{pmatrix} L^* \\ a^* \\ b^* \end{pmatrix} - \begin{pmatrix} L^* \\ a^* \\ b^* \end{pmatrix}$$

for the set of $L^*=10$ to 90, $a^*=b^*=0$. FIG. 5 shows the performance evaluation curves obtained by plotting the error $\Delta$ with respect to the value of $L^*$ for each of the components $L^*$, $a^*$, and $b^*$.

In FIG. 5, the results of evaluation of signal transform with the conventional enclosing process are indicated by the solid lines, and the results of evaluation of signal transform with the method for transforming a color signal in accordance with the present invention are indicated by the broken lines.

As illustrated in FIG. 5, with the conventional method, a large error occurs in the vicinity of the boundary of the color reproduction range. However, with the method for transforming a color signal in accordance with the present invention, a large error does not occur even in the vicinity of the boundary of the color reproduction range. Therefore, with the method for transforming a color signal in accordance with the present invention, an accurate interpolating process can be carried out over the entire color reproduction range.

What is claimed is:

1. A method for transforming a color signal, comprising the steps of:

(a) creating a look-up table storing a plurality of three-dimensional input signal components and a plurality of corresponding three-dimensional output color signal components, each of which is obtained with one of the three-dimensional input signal components;

(b) transforming a target output color signal component into a three-dimensional input signal component of said plurality of three-dimensional input signal components by referring to the look-up table; and (c) interpolating the three-dimensional input signal component corresponding to the target output color signal component, which is not stored in the look-up table, with an interpolating process from a plurality of the three-dimensional input signal components corresponding to a plurality of the three-dimensional output color signal components, which are stored in the look-up table and which are close to the target output color signal component, said linear interpolating process including, (c1) designating the plurality of the three-dimensional input signal components stored in the look-up table as lattice points in a three-dimensional input signal space, and designating the plurality of the three-dimensional output color signal components stored in the look-up table as lattice points in a three-dimensional output color signal space, (c2) setting a certain appropriate origin and three linearly independent vectors in said three-dimensional output color signal space, (c3) originating said three linearly independent vectors from said origin, a local coordinate system being thereby constituted in said three-dimensional output color signal space, (c4) transforming a difference between the target output color signal component and said origin into local coordinates in said local coordinate system in said three-dimensional output color signal space, (c5) updating said origin and said three linearly independent vectors by utilizing said local coordinates in said three-dimensional output color signal space, (c6) repeating steps (c3)–(c5), a plurality of times, thereby determining a new local coordinate system and new coordinates in said three-dimensional output color signal space, and (c7) taking a point, which is in a local coordinate system in said three-dimensional input signal space, the local coordinate system corresponding to said new local coordinate system in said three-dimensional output color signal space, and which is represented by said new coordinates, as a resultant three-dimensional input signal component, which corresponds to the target output color signal component.

2. A method as defined in claim 1, wherein said creating step (a) comprises incrementally altering adjacent three-dimensional input signal components of said plurality of three-dimensional input signal components stored in said look-up table.

3. A method as defined in claim 1, further comprising (d) outputting the resultant three-dimensional input signal component to a color image output apparatus.

4. A method for transforming a color signal, comprising the steps of:

(a) creating a look-up table storing a plurality of three-dimensional input signal components and a plurality of corresponding three-dimensional output color signal components, each of which is obtained with one of the three-dimensional input signal components;

(b) transforming a target output color signal component into a three-dimensional input signal component of said plurality of three-dimensional input signal components by referring to the look-up table; and (c) interpolating the three-dimensional input signal component corresponding to the target output color signal component, which is not stored in the look-up table, with a linear interpolating process from a plurality of the three-dimensional input signal components corresponding to a plurality of the three-dimensional output color signal components, which are stored in the look-up table and which are close to the target output color signal component, said linear interpolating process including, (c1) designating the plurality of the three-dimensional input signal components stored in the look-up table as lattice points in a three-dimensional input signal space, and designating the plurality of the three-dimensional output color signal components stored in the look-up table as lattice points in a three-dimensional output color signal space, (c2) setting an origin (i, j, k) and a displacement (di, dj, dk) in said three-dimensional output color signal space, where each of i, j, and k represents the lattice point step position with respect to one of three-dimensional directions, wherein i, j, k=1, 2, 3, . . . , and di, dj, dk=1 or −1, (c3) constructing a local coordinate system in said three-dimensional output color signal space by using a point (i, j, k), a point (i+di, j, k), a point (i, j+dj, k), and a point (i, j, k+dk), (c4) calculating a representation vector $q=(q_i, q_j, q_k)$, which represents the target output color signal component, in said local coordinate system in said three-dimensional output color signal space, (c5) approximating each of the values of $i+diq_i$, $j+djq_j$, and $k+dkq_k$ to an integer, (c6) updating said origin (i, j, k) with respective integers from step (c5) equalling a new i, a new j, and a new k, and carrying out a displacement updating process such that, when a representation vector q is calculated by using said updated original, reversing the displacement di if $q_i$ is negative, reversing the displacement dj if $q_j$ is negative, and reversing the displacement dk if $q_k$ is negative, (c7) repeating steps (c2)–(c6), and until an updated original and an updated displacement have become respectively equal to a predecessor origin (i, j, k) and a predecessor displacement in said three-dimensional output color signal space, and (c8) interpolating a resultant input signal component point, which is represented by the representation vector $q=(q_i\ q_j\ q_k)$, with a linear interpolating process from four points (i, j, k), (i+di, j, k), (i, j+dj, k), and (i, j, k+dk) in a local coordinate system, which is constituted by said four points in said three-dimensional input signal space.

5. A method as defined in claim 4, wherein the approximating step (c5) includes rounding to the nearest whole number in order to approximate each of the values if $i+diq_i$, $j+djq_j$, and $k+dkq_k$ to an integer.

6. A method as defined in claim 4, wherein said creating step (a) comprises incrementally altering adjacent three-dimensional input signal components of said plurality of three-dimensional input signal components stored in said look-up table.

7. A method as defined in claim 6, wherein said designating step (c1) includes constructing said three-dimensional input signal space and said three-dimensional output color signal space in integral steps.

8. A method as defined in claim 4, further comprising (d) outputting the resultant input signal component point to a color image output apparatus.

9. A method for transforming a color signal, comprising the steps of:

(a) creating a look-up table storing a plurality of three-dimensional input signal components and a corresponding plurality of three-dimensional output chromaticity signal components, each of which is obtained with one of the three-dimensional input signals components;

(b) transforming a target output chromaticity signal component into a three-dimensional input signal component of said plurality of three-dimensional input signal components by referring to the look-up table; and (c) interpolating the three-dimensional input signal component corresponding to the target output chromaticity signal component, which is not stored in the look-up table, with an interpolating process from a plurality of the three-dimensional input signal components corresponding to a plurality of the three-dimensional output chromaticity signal components, which is not stored in the look-up table, with an interpolating process from a plurality of the three-dimensional input signal components corresponding to a plurality of the three-dimensional output chromaticity signal components, which are stored in the look-up table and which are close to the target output chromaticity signal component, the linear interpolating process including (c1) designating the plurality of the three-dimensional input signal components stored in the look-up table as lattice points in a three-dimensional input signal space, and designating the plurality of the three-dimensional output chromaticity signal components stored in the look-up table as lattice points in a three-dimensional output chromaticity signal space, (c2) setting a certain appropriate origin and three linearly independent vectors in said three-dimensional output chromaticity signal space, (c3) originating said three linearly independent vectors from said origin, thereby constructing a local coordinate system in said three-dimensional output chromaticity signal space, (c4) transforming a difference between the target output chromaticity signal component and said origin into local coordinates in said local coordinate system in said three-dimensional output chromaticity signal space, (c5) updating said origin and said three vectors by utilizing said local coordinates in said three-dimensional output chromaticity signal space, (c6) repeating steps (c3)–(c5), a plurality of times, thereby determining a new local coordinate system and new coordinates in said three-dimensional output chromaticity signal space, and (c7) taking a point, which is in a local coordinate system in said three-dimensional input signal space, the local coordinate system corresponding to said new local coordinate system in said three-dimensional output chromaticity signal space, and which is represented by said new coordinates, as a resultant three-dimensional input signal component, which corresponds to the target output chromaticity signal components.

10. A method as defined in claim 9, wherein said creating step (a) comprises incrementally altering adjacent three-dimensional input signal components of said plurality of three-dimensional input signal components stored in with look-up table.

11. A method as defined in claim 9, further comprising (d) outputting the resultant three-dimensional input signal component to a color image output apparatus.

12. A method for transforming a color signal, comprising the steps of:

(a) creating a look-up table storing a plurality of three-dimensional input signal components and a corresponding plurality of three-dimensional output chromaticity signal components, each of which is obtained with one of the three-dimensional input signal components;

(b) transforming a target output chromaticity signal component into a three-dimensional input signal component by referring to the look-up table; and (c) interpolating a three-dimensional input signal component corresponding to the target output chromaticity signal component, which is not stored in the look-up table, with a linear interpolating process from a plurality of the three-dimensional input signal components corresponding to the plurality of the three-dimensional output chromaticity signal components, which are stored in the look-up table and which are close to the target output chromaticity signal component, said linear interpolating process including (c1) designating the plurality of the three-dimensional input signal components stored in the look-up table as lattice points in a three-dimensional input signal space, and designating the plurality of the three-dimensional output chromaticity signal components stored in the look-up table as lattice points in a three-dimensional output chromaticity signal space, (c2) setting an origin (i, j, k) and a displacement (di, dj, dk) in said three-dimensional output chromaticity signal space, where each of i, j, and k represents the lattice point step position with respect to one of three-dimensional directions, wherein i, j, k=1, 2, 3, . . . , and di, dj, dk=1 or −1, (c3) constructing a local coordinate system in said three-dimensional output chromaticity signal space by using a point (i, j, k), a point (i+di, j, k), a point (i, j+dj, k), and a point (i, j, k+dk), (c4) calculating a representation vector $q=(q_i, q_j, q_k)$, which represents the target output chromaticity signal component, in said local coordinate system in said three-dimensional output chromaticity signal space, (c5) approximating each of the values of $i+diq_i$, $j+djq_j$ and $k+dkq_k$ to an integer, (c6) updating said origin (i, j, k) with respective integers from step (c5) equalling a new i, a new j, and a new k, and carrying out a displacement updating process such that, when a representation vector q is calculated by using said updated origin, reversing a direction of the displacement di if $q_i$ is negative, reversing a direction the displacement dj if $q_j$ negative, and reversing a direction the displacement dk if $q_k$ is negative, (c7) repeating steps (c2)–(c6) until an updated original and an updated displacement have become respectively equal to the predecessor original and the predecessor displacement in said three-dimensional output chromaticity signal space, and (c8) interpolating a resultant input signal component point, which is represented by the representation vector $q=(q_i, q_j, q_k)$, with a linear interpolating process from four points (i, j, k), (i+di, j, k), (i, j+dk, k) and (i, j, k+dk) in a local coordinate system, which is constituted by said four points in said three-dimensional input signal space.

13. A method as defined in claim 12, wherein said approximating step (c5) includes rounding to the nearest whole number in order to approximate each of the values of $i+diq_i$, $j+djq_j$, and $k+dkq_k$ to an integer.

14. A method as defined in claim 12, wherein said creating step (a) comprises incrementally altering adjacent three-dimensional input signal components of said plurality of three-dimensional input signal components stored in said look-up table.

15. A method as defined in claim 14, wherein said designating step (c1) includes constructing said three-dimensional input signal space and said three-dimensional output chromaticity signal space in integral steps.

16. A method as defined in claim 12, further comprising (d) outputting the resultant three-dimensional input signal component point to a color image output apparatus.

17. A method for transforming a color signal, comprising the steps of:

(a) creating a look-up table storing a plurality of three-dimensional input signal components, and a plurality of corresponding three-dimensional output optical density signal components, each of which is obtained with one of the three-dimensional input signal components;

(b) transforming a target output optical density signal component into a three-dimensional input signal component by referring to the look-up table; and (c) interpolating the three-dimensional input signal component corresponding to the target output optical density signal component, which is not stored in the look-up table, with an interpolating process using the plurality of the three-dimensional input signal components corresponding to the plurality of the three-dimensional output optical density signal components, which are stored in the look-up table and which are close to the target output optical density signal component, said linear interpolating process including (c1) designating the plurality of the three-dimensional input signal components stored in the look-up table as lattice points in a three-dimensional output signal space, and designating the plurality of the three-dimensional output optical density signal components stored in the look-up table as lattice points in a three-dimensional output optical density signal space, (c2) setting a certain appropriate origin and three linearly independent vectors in said three-dimensional output optical density signal space, (c3) originating said three linearly independent vectors from said original, thereby constructing a local coordinate system being in said three-dimensional output optical signal space, (c4) transforming a difference between the target output optical density signal component and said origin into local coordinates in said local coordinate system in said three-dimensional output optical density signal space, (c5) updating said origin and said three linearly independent vectors by utilizing said local coordinates in said three-dimensional output optical density signal space, (c6) repeating steps (c3)–(c5) a plurality of times, thereby determining a new local coordinate system and new coordinates in said three-dimensional output optical density signal space, and (c7) taking a point, which is in a local coordinate system in said three-dimensional input signal space, the local coordinate system corresponding to said new local coordinate system in said three-dimensional output optical density signal space, and which is represented by said new coordinates, as a resultant three-dimensional input signal component, which corresponds to the target output optical density signal components.

18. A method as defined in claim 17, wherein said creating step (a) comprises incrementally altering adjacent three-dimensional input signal components of said plurality of three-dimensional input signal components stored in said look-up table.

19. A method as defined in claim 17, further comprising (d) outputting the resultant three-dimensional input signal component to a color image output apparatus.

20. A method for transforming a color signal, comprising the steps of:

(a) creating a look-up table storing a plurality of three-dimensional input signal components, which change in steps and which are fed into a color image output apparatus, and a plurality of corresponding three-dimensional output optical density signal components, each of which is obtained with one of the three-dimensional input signal components;

(b) transforming a target output optical density signal component into a three-dimensional input signal component by referring to the look-up table; and (c) interpolating this three-dimensional input signal component corresponding to the target output optical density signal component which is not stored in the look-up table, with a linear interpolating process from the plurality of the three-dimensional input signal components corresponding to the plurality of the three-dimensional output optical density signal components, which are stored in the look-up table and which are close to the target output optical density signal component, said linear interpolating process including, (c1) designating the plurality of the three-dimensional input signal components stored in the look-up table as lattice points in a three-dimensional input signal space, and designating the plurality of the three-dimensional output optical density signal components stored in the look-up table as lattice points in a three-dimensional output optical density signal space, (c2) setting an origin (i, j, k) and a displacement (di, dj, dk) in said three-dimensional output optical density signal space, where each of i, j, and k represents a lattice point position with respect to one of three-dimensional directions, wherein i, j, k=1, 2, 3, ..., and di, dj, dk=1 or −1, (c3) constructing a local coordinate system in said three-dimensional output optical density signal space by using a point (i, j, k), a point (i+di, j, k), a point (i, j+dj, k), and a point (i, j, k+dk), (c4) calculating a representation vector $q=(q_i, q_j, q_k)$, which represents the target output optical density signal component, in said local coordinate system in said three-dimensional output optical density signal space, (c5) approximating each of the values of $i+diq_i$, $j+dj_j$, and $k+dkq_k$ to an integer, (c6) updating said origin (i, j, k) with respective integers from step (c5) equalling a new i, a new j, a new k, respectively and carrying out a displacement updating process such that, when a representation vector q is calculated by using said updated origin, reversing the displacement di if $q_i$ is negative, reversing the displacement dj if $q_j$ is negative, and reversing the displacement dk if $q_k$ is negative, (c7) repeating steps (c2)–(c6) until an updated original and an updated displacement have respectively equal a predecessor origin and a predecessor displacement in said three-dimensional output optical density signal space, and (c8) interpolating a resultant input signal component point, which is represented by the representation vector $q=(q_i, q_j, q_k)$, with a linear interpolating process from four points (i, j, k), (i+di, j,k), (i, j+dj, k), and (i, j, k+dk) in a local coordinate system, which is constituted by said four points in said three-dimensional input signal space.

21. A method as defined in claim 20, wherein said approximating step (c5) includes rounding to the nearest whole number in order to approximate each of the values of $i+diq_i$, $j+djq_j$, and $k+dkq_k$ to an integer.

22. A method as defined in claim 20, wherein said creating step (a) comprises incrementally altering adjacent three-dimensional input signal components of said plurality of three-dimensional input signal components stored in said look-up table.

23. A method as defined in claim 22, wherein said designating step (c1) includes constructing said three-dimensional input signal space and said three-dimensional output optical density signal space in integral steps.

24. A method as defined in claim 20, further comprising (d) outputting the resultant input signal component point to a color image output apparatus.

25. A method for transforming a color signal, comprising the steps of:

(a) creating a look-up table storing a plurality of three-dimensional input signal components and a plurality of corresponding three-dimensional output signal components, which describe colors and each of which is obtained with one of the three-dimensional input signal components;

(b) transforming a target output signal component into a three-dimensional input signal component by referring to the look-up table; and (c) interpolating the three-dimensional input signal component corresponding to the target output signal component, which is not stored in the look-up table, with an interpolating process from the plurality of the three-dimensional input signal components corresponding to the plurality of the three-dimensional output signal components, which are stored in the look-up table and which are close to the target output signal component, said linear interpolating process including, (c1) designating the plurality of the three-dimensional input signal components stored in the look-up table as lattice points in a three-dimensional input signal space and designating the plurality of the three-dimensional output signal components stored in the look-up table as lattice points a three-dimensional output signal space, (c2) setting a certain appropriate origin and three linearly independent vectors in said three-dimensional output signal space, (c3) designating said three linearly independent vectors from said origin, thereby constructing a local coordinate system being in said three-dimensional output signal space, (c4) transforming a difference between the target output signal component and said origin into local coordinates in said local coordinate system in said three-dimensional output signal space, (c5) updating said origin and said three vectors by utilizing said local coordinates in said three-dimensional output signal space, (c6) repeating steps (c3)–(c5) a plurality of times, thereby determining a new local coordinate system and new coordinates in said three-dimensional output signal space, and (c7) taking a point, which is in a local coordinate system in said three-dimensional input signal space, the local coordinate system corresponding to said new local coordinate system in said three-dimensional output signal space, and which is represented by said new coordinates, as a resultant three-dimensional input signal component, which corresponds to the target output signal components.

26. A method as defined in claim 25, wherein said creating step (a) comprises incrementally altering adjacent three-dimensional input signal components of said plurality of three-dimensional input signal components stored in with look-up table.

27. A method as defined in claim 25, further comprising
(d) outputting the resultant three-dimensional input signal component to a color image output apparatus.

28. A method for transforming a color signal, comprising the steps of:
(a) creating a look-up table storing a plurality of three-dimensional input signal components and a plurality of corresponding three-dimensional output signal components, which describe colors and each of which is obtained with one of the three-dimensional input signal components;
(b) transforming a target output signal component into a three-dimensional input signal component by referring to the look-up table; and
(c) interpolating the three-dimensional input signal component corresponding to the target output signal component, which is not stored in the look-up table, with a linear interpolating process from the plurality of the three-dimensional input signal components corresponding to the plurality of the three-dimensional output signal components, which are stored in the look-up table and which are close to the target output signal component, said linear interpolating process including,
(c1) designating the plurality of the three-dimensional input signal components stored in the look-up table as lattice points in a three-dimensional input signal space and designating the plurality of the three-dimensional output signal components stored in the look-up table as lattice points in a three-dimensional output signal space,
(c2) setting an origin (i, j, k) and a displacement (di, dj, dk) in said three-dimensional output signal space, where each of i, j, and k represents the lattice point step position with respect to one of three-dimensional directions, wherein i, j, k=1, 2, 3, . . . , and di, dj, dk=1 or −1,
(c3) constructing a local coordinate system in said three-dimensional output signal space by using a point (i, j, k), a point (i+di, j, k), a point (i, j+dj, k) and a point (i, j, k+dk),
(c4) calculating a representation vector q=($q_i$, $q_j$, $q_k$), which represents the target output signal component, in said local coordinate system in said three-dimensional output signal space,
(c5) approximating each of the values of i+di$q_i$, j+dj$q_j$, and k+dk$q_k$ to an integer,
(c6) updating said origin (i, j, k) with respective integers from step (c5) equalling a new i, a new j, and a new k, and carrying out a displacement updating process such that, when a representation vector q is calculated by using said updated origin, reversing the displacement di if $q_i$ is negative, reversing the displacement dj if $q_j$ is negative, and reversing the displacement dk if $q_k$ is negative,
(c7) repeating steps (c2)–(c6) until an updated origin and an updated displacement have become respectively equal to the predecessor origin and the predecessor displacement in said three-dimensional output signal space, and
(c8) interpolating an input signal component point, which is represented by the representation vector q=($q_i$, $q_j$, $q_k$), with a linear interpolating process from four points (i, j, k), (i+di, j, k), (i, j+dj, k), and (i, j, k+dk) in a local coordinate system, which is constituted by said four points in said three-dimensional input signal space.

29. A method as defined in claim 28, wherein said approximating step (c5) includes rounding to the nearest whole number is utilized in order to approximate each of the values of i+di$q_i$, j+dj$q_j$, and k+dk$q_k$ to an integer.

30. A method as defined in claim 28, wherein said creating step (a) comprises incrementally altering adjacent three-dimensional input signal components of said plurality of three-dimensional input signal components stored in said look-up table.

31. A method as defined in claim 30, wherein said designating step (c1) includes constructing said three-dimensional input signal space and said three-dimensional output signal space in integral steps.

32. A method as defined in claim 28, further comprising
(d) outputting the resultant three-dimensional input signal component to a color image output apparatus.

* * * * *